(12) United States Patent
Yamaguchi et al.

(10) Patent No.: US 7,277,271 B2
(45) Date of Patent: Oct. 2, 2007

(54) SOLID ELECTROLYTIC CAPACITOR

(75) Inventors: Hideto Yamaguchi, Kyoto (JP);
Katsuhisa Ishizaki, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/488,780

(22) Filed: Jul. 19, 2006

(65) Prior Publication Data
US 2007/0019366 A1    Jan. 25, 2007

(30) Foreign Application Priority Data
Jul. 22, 2005   (JP)   ............... 2005-212497

(51) Int. Cl.
*H01G 9/00*   (2006.01)
(52) U.S. Cl. ............... 361/523; 361/525; 361/528; 361/529; 361/534; 361/540; 29/25.01; 29/25.03
(58) Field of Classification Search ........ 361/523–525, 361/528–534, 516–519, 502–512, 302–305; 29/25.01, 25.03
See application file for complete search history.

(56) References Cited
U.S. PATENT DOCUMENTS 5,478,965 A * 12/1995 Hashiba .................. 29/25.03
5,638,253 A * 6/1997 Hasegawa ................ 361/535
6,236,561 B1 * 5/2001 Ogino et al. ............. 361/523
6,535,375 B1 * 3/2003 Jung et al. ............... 361/523
6,616,713 B2 * 9/2003 Sano et al. ............... 29/25.03
6,912,117 B2 * 6/2005 Arai et al. ................ 29/25.03
7,135,754 B2 * 11/2006 Sano et al. ............... 361/540
7,139,163 B2 * 11/2006 Sawano .................... 361/540

FOREIGN PATENT DOCUMENTS

JP     2000-340463    12/2000

* cited by examiner

*Primary Examiner*—Nguyen T. Ha
(74) *Attorney, Agent, or Firm*—Wenderoth, Lind & Ponack, L.L.P.

(57) ABSTRACT

A solid electrolytic capacitor includes a capacitor unit having a cathode frame coupled to a cathode part of a capacitor element, and anode frames formed at the opposite sides of the capacitor unit sandwiching a cathode frame, and coupled to an anode part of the capacitor element. Flat parts provided at the opposite ends of anode terminals are coupled to the anode frames. A flat part provided in the center of a cathode terminal is coupled to the cathode frame. The capacitor unit is covered with coating resin. The solid electrolytic capacitor has a simplified structure and a lower ESL.

7 Claims, 12 Drawing Sheets

FIG. 27 – PRIOR ART
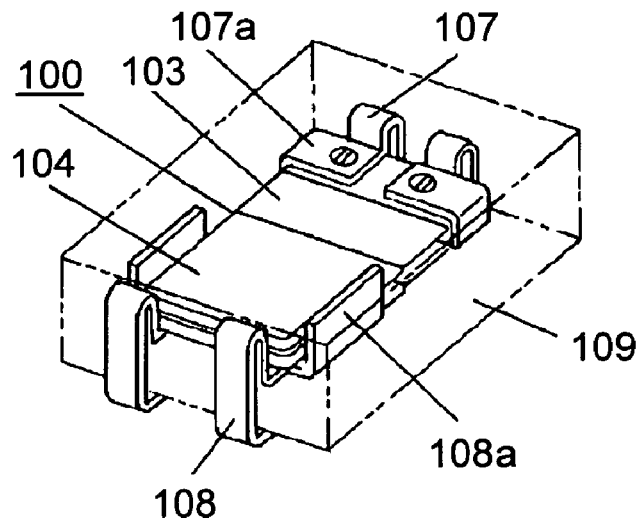
FIG. 28 - PRIOR ART
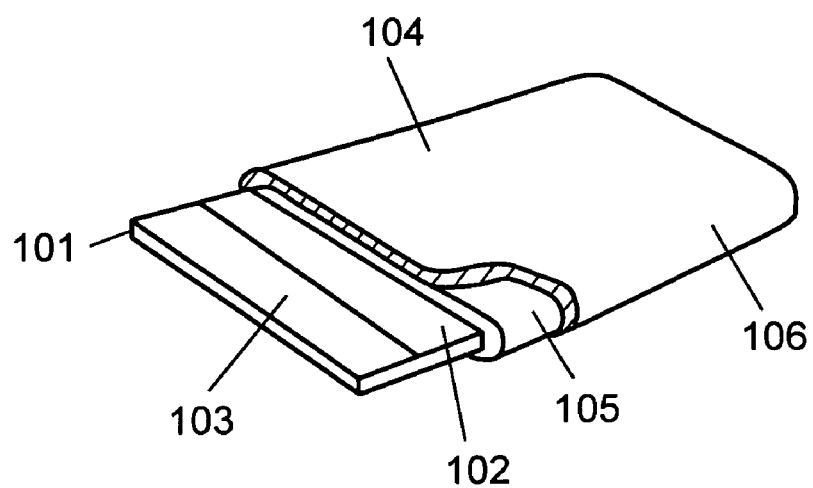

SOLID ELECTROLYTIC CAPACITOR

BACKGROUND OF THE INVENTION

1. Field of the Invention

The present invention relates to a capacitor used for various types of electronic devices, particular to a solid electrolytic capacitor using conductive polymer for its solid electrolyte.

2. Background Art

According to increasing demand for the use of electronic devices in a high frequency region, a capacitor, a type of electronic component, is requested to have a more excellent impedance characteristic in a high-frequency region than a conventional one. In order to meet such a request, various kinds of capacitors are examined using conductive polymer with high electric conductance for its solid electrolyte.

FIG. 26 is a sectional side view illustrating the makeup of this type of conventional solid electrolytic capacitor. FIG. 27 is a perspective view of the same. FIG. 28 is a partial perspective cutaway view illustrating the makeup of a capacitor element used for the solid electrolytic capacitor.

Capacitor element 100 has a dielectric oxide film layer (not illustrated) formed on the surface of anode body 101 made of aluminum foil, which is a valve metal. Insulating body 102 provided on anode body 101 with a dielectric oxide film layer separates anode part 103 from cathode part 104. The surface of the above-mentioned dielectric oxide film layer at the side of cathode part 104 has thereon solid electrolyte layer 105 made of conductive polymer and cathode layer 106 made of carbon and silver paste, each sequentially laminated.

The solid electrolytic capacitor has anode terminal 107, cathode terminal 108 and guide 108a formed by bending upward the bonding faces of cathode terminal 108. Anode part 103 is bonded to the bonding face of anode terminal 107; and cathode part 104, to that of cathode terminal 108. Anode part 103 is coupled to bent junction 107a on the bonding face of anode terminal 107, with resistance welding; and cathode part 104 is coupled to the bonding face of cathode terminal 108 through conductive silver paste.

Insulating coating resin 109 covers capacitor element 100 in a state where part of anode terminal 107 and cathode terminal 108, each coupled to capacitor element 100, are respectively exposed from the coating resin.

Anode terminal 107 and cathode terminal 108, exposed from coating resin 109, respectively become outside terminals by being bent from their sides toward their bottom surfaces along coating resin 109.

The above-mentioned conventional capacitor is disclosed in Japanese Patent Unexamined Publication No. 2000-340463, for example.

However, in the above-mentioned conventional solid electrolytic capacitor, the distances from the contact faces of anode part 103 and anode terminal 107, and of cathode part 104 and cathode terminal 108, of capacitor element 100, to the mounting surfaces, are all long, thus representing a poor ESL (equivalent series inductance) characteristic. In recent years, electrolytic capacitors particularly used for around a CPU chip for a personal computer, have been strongly demanded for smaller size with larger capacity. Further, electrolytic capacitors are not applicable to an application in high frequency band requiring high noise removability and high transient response as well as a lower ESR (equivalent series resistance) and a lower ESL in higher frequency.

SUMMARY OF THE INVENTION

An object of the present invention is to provide a solid electrolytic capacitor capable of attaining a lower ESL by shortening the lead distance from the capacitor element to a terminal.

A solid electrolytic capacitor according to the present invention is equipped with a capacitor unit having a cathode frame coupled to the cathode part of the capacitor element; and anode frames formed on the opposite sides sandwiching the cathode frame, coupled to the anode part of the capacitor element. Flat parts provided on the opposite ends of the anode terminal are coupled to the anode frames. A flat part provided in the center of the cathode terminal is coupled to the cathode frame. The capacitor unit is covered with coating resin. The structure is simplified to enable reducing the ESL.

Additional objects and advantages of the present invention will be apparent from the following detailed description of exemplary embodiments thereof, which are best understood with reference to the accompanying drawings.

BRIEF DESCRIPTION OF THE DRAWINGS

FIG. 27 is a perspective view illustrating the makeup of the conventional solid electrolytic capacitor.

FIG. 28 is a partial perspective cutaway view illustrating the makeup of the conventional capacitor element.

DETAILED DESCRIPTION OF THE INVENTION

First Exemplary Embodiment

Hereinafter a description is made for an aspect of the present invention using the first exemplary embodiment.

Figure 1:
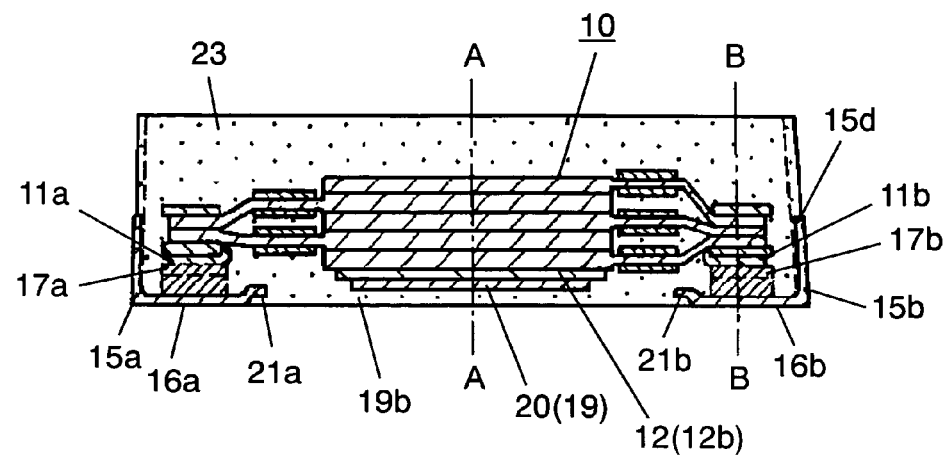
FIG. 1 is a sectional side view illustrating the makeup of a solid electrolytic capacitor according to the first exemplary embodiment of the present invention.
Figure 2:
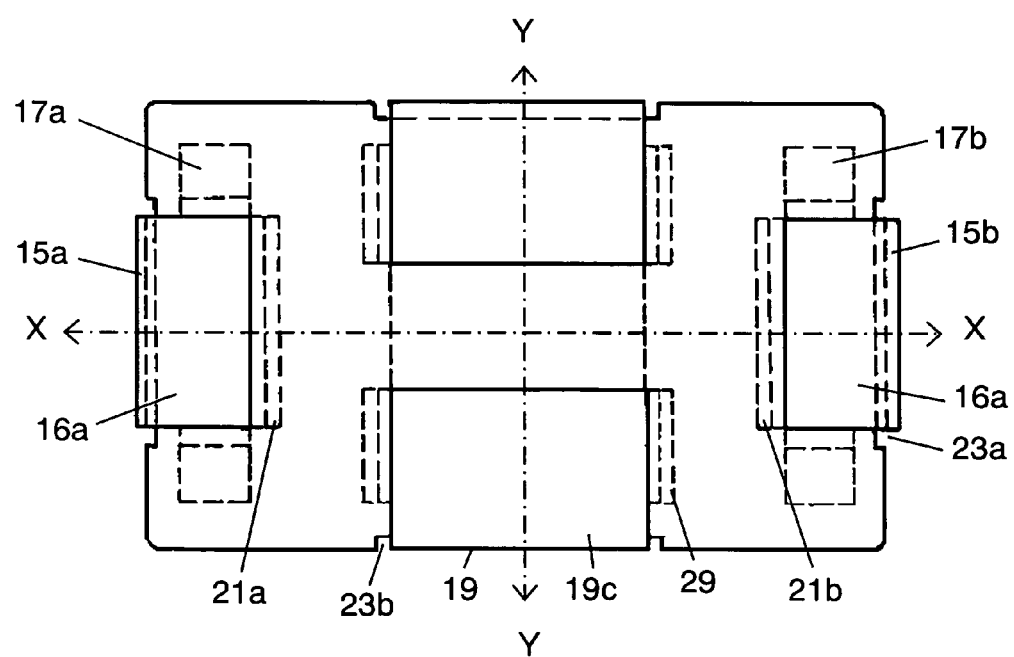
FIG. 2 is a bottom view illustrating the makeup of the solid electrolytic capacitor according to the first exemplary embodiment of the present invention.
Figure 3:
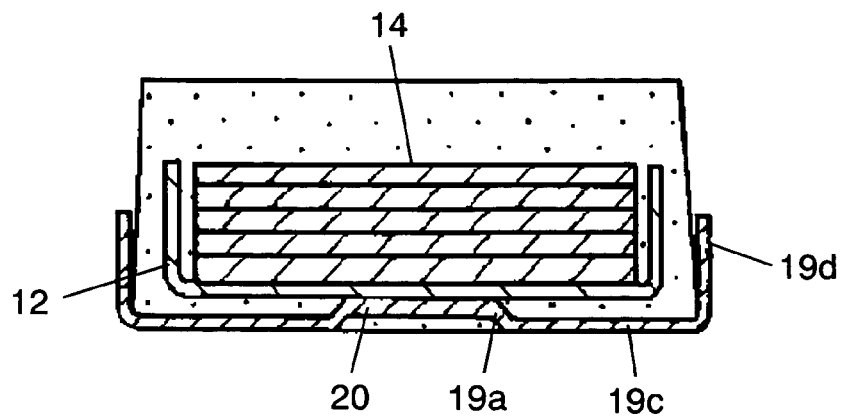
FIG. 3 is a sectional view showing the cross section A-A of FIG. 1.
Figure 4:
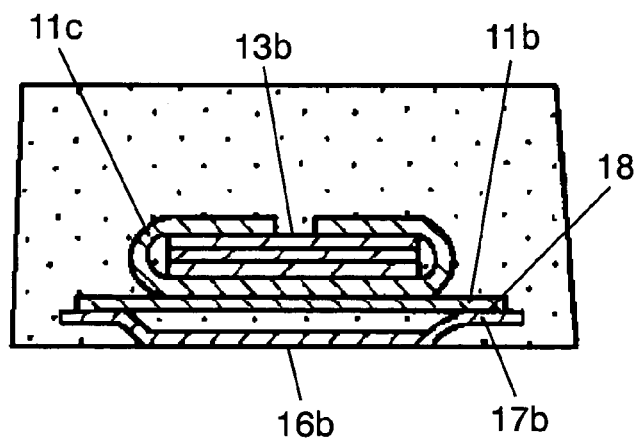
FIG. 4 is a sectional view showing the cross section B-B of FIG. 1.
Figure 5:
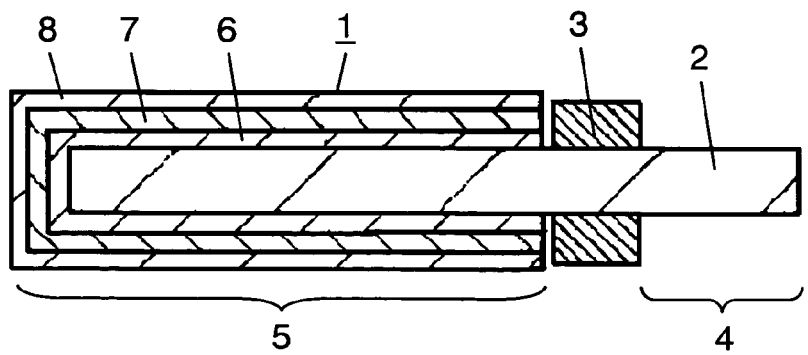
FIG. 5 is a sectional view of a capacitor element according to the first exemplary embodiment of the present invention.
Figure 6:
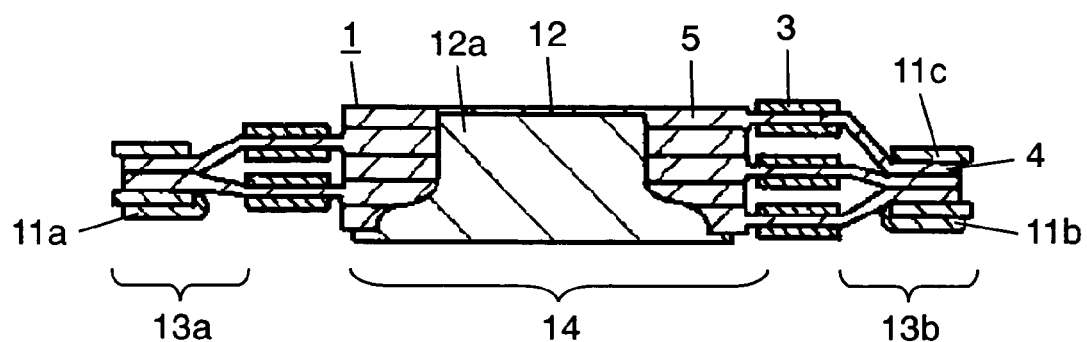
FIG. 6 is a side view of a capacitor unit according to the first exemplary embodiment of the present invention.
Figure 7:
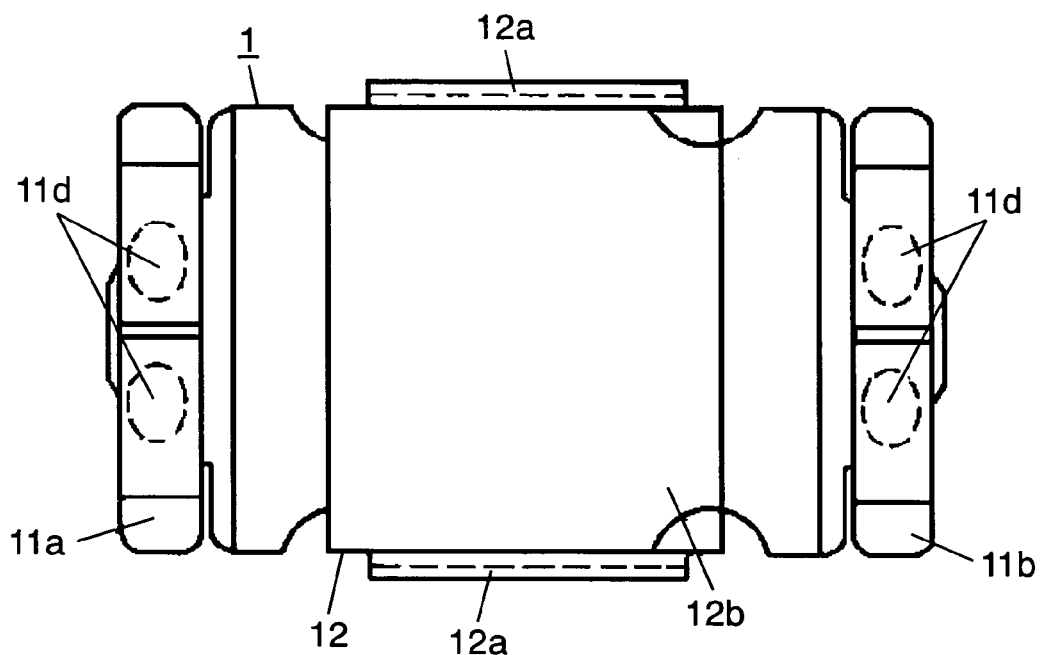
FIG. 7 is a bottom view of the capacitor unit according to the first exemplary embodiment of the present invention.
Figure 8:
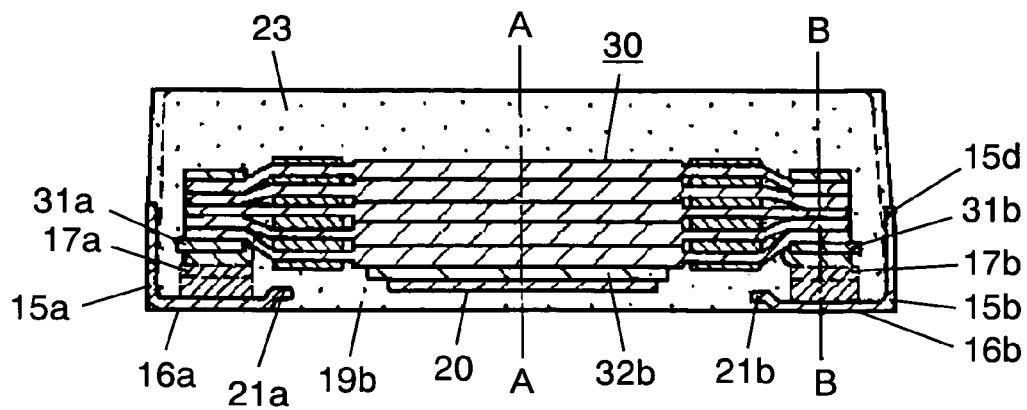
FIG. 8 is a sectional side view illustrating the makeup of a solid electrolytic capacitor according to the second exemplary embodiment of the present invention.
Figure 9:
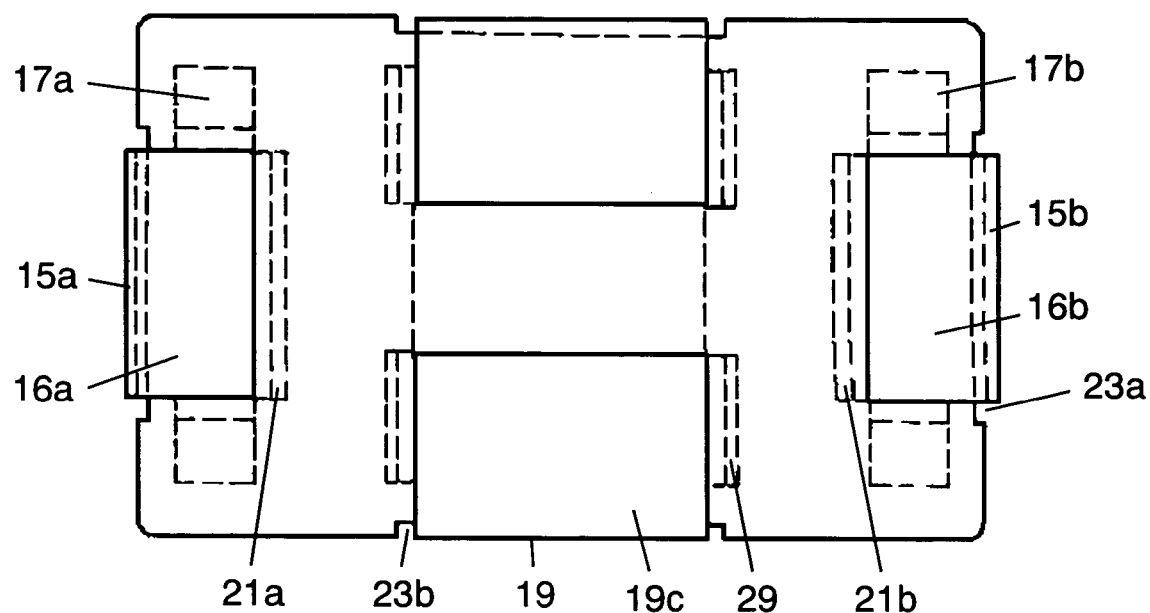
FIG. 9 is a bottom view illustrating the makeup of the solid electrolytic capacitor according to the second exemplary embodiment of the present invention.
Figure 10:
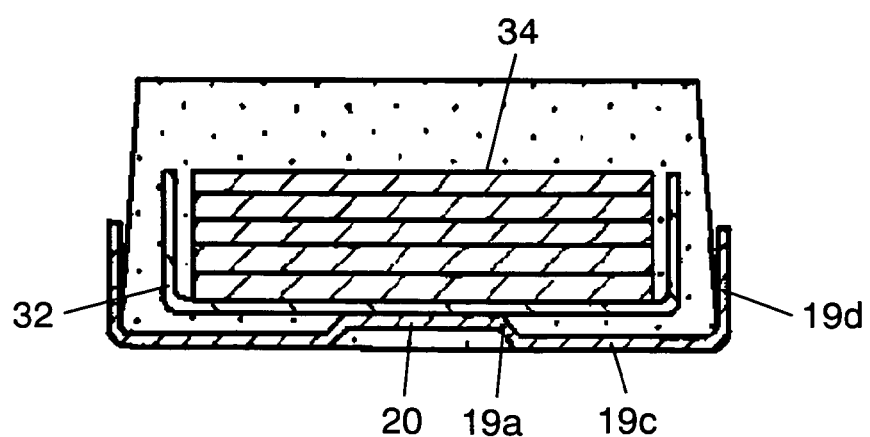
FIG. 10 is a sectional view showing the cross section A-A of FIG. 8.
Figure 21:
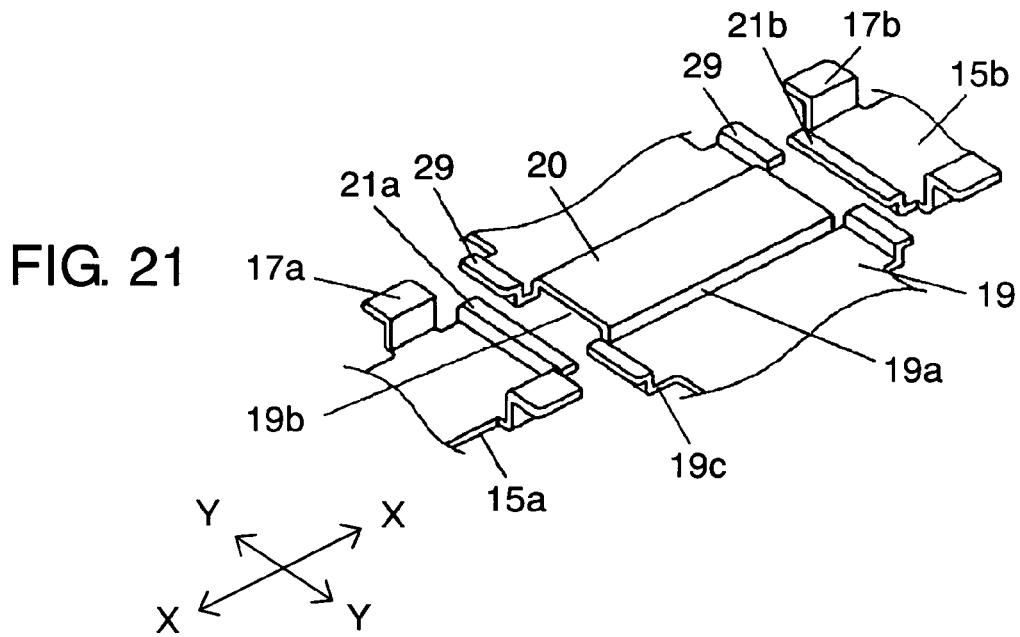
FIG. 21 is a perspective view of the substantial part illustrating the makeup of an anode terminal and a cathode terminal used in the first and second exemplary embodiments of the present invention.

FIGS. 1 through 4 illustrate the makeup of a solid electrolytic capacitor according to the first exemplary embodiment of the present invention. FIG. 5 is a sectional view illustrating the makeup of a capacitor element used for the solid electrolytic capacitor. FIGS. 6 and 7 illustrate the makeup of the capacitor unit. FIG. 21 is a perspective view of the substantial part illustrating the makeup of an anode terminal and a cathode terminal used for the solid electrolytic capacitor.

As shown in FIG. 5, capacitor element 1 is sectioned into two components: anode part 4 and cathode part 5, by providing insulator layer 3 on the surface of flat-shaped anode body 2 made of aluminum foil which is a valve metal foil. The surface of anode body 2, extending toward cathode part 5, has thereon dielectric oxide film layer 6, solid electrolyte layer 7 made of conductive polymer, and cathode layer 8 made of a carbon layer and silver paste layer, each sequentially laminated.

Next, a description is made for a method of manufacturing capacitor element 1 according to the first exemplary embodiment.

First, electrochemically etch aluminum foil with a thickness of 100 μm to roughen the foil surface.

Next, immerse the roughened aluminum foil in 3% aqueous ammonium adipate solution, and anodize it at an applied voltage of 12 V at an aqueous solution temperature of 70° C. for 60 minutes. Consequently, an aluminum oxide layer to be a part of dielectric oxide film layer 6 is formed.

Next, process the aluminum foil with a part of dielectric oxide film layer 6 formed thereon, into a 6 mm width strip; form insulator layer 3 with a polyimide adhesive tape along the strip; and then press the strip-shaped aluminum foil to form a comb-like shape.

In this comb-like shape, its teeth correspond to anode body 2 with dielectric oxide film layer 6 formed; and anode body 2 near the basal portion of the teeth is provided with insulator layer 3. Anode parts 4 are linked together end to end along the lengthwise direction of the strip.

Next, form an aluminum oxide layer on the cross section of the aluminum foil, by anodizing again in the above-mentioned conditions. Consequently, dielectric oxide film layer 6 made of the aluminum oxide layer is formed on the roughened surface and the cross-sectional surface of the aluminum foil at the projection of the above-mentioned comb-like shape.

Next, a description is made for a method of manufacturing solid electrolyte layer 7.

First, immerse anode body 2 at the cathode part 5 side (namely the teeth of a comb) in a 30% aqueous manganese nitrate solution; let it dry naturally; and then decompose it by heat at 300° C. for 10 minutes, to form a manganese oxide layer as a conducting layer composing a part of solid electrolyte layer 7.

Next, preliminarily mix 0.5 mol/L of pyrrole monomer and 0.1 mol/L of sodium propyl-naphthalenesulfonate. Add water as solvent and propyl phosphoric ester as a pH adjuster to this liquid mixture and adjust pH to 2, to produce polymerization solution for forming a solid electrolyte.

Immerse anode body 2 at the side of cathode part 5, with a manganese oxide layer formed, in the polymerization solution for forming a solid electrolyte; approximate an electrode for starting polymerization to the surface of anode body 2, to perform electrolytic oxidation polymerization at a polymerization voltage of 1.5 V. The electrolytic oxidation polymerization produces solid electrolyte layer 7 with conductive polymer layer laminated on the surface of the conducting layer.

Next, a description is made for a method of manufacturing cathode layer 8.

Immerse anode body 2 at the side of cathode part 5 (namely the teeth of a comb) where solid electrolyte layer 7 is produced, in a colloidal carbon suspension, to apply solid electrolyte layer 7 with the suspension; and then dry it to form a carbon layer.

Next, immerse anode body 2 at the side of cathode part 5 in silver paste to apply electrodes 2 with the paste; harden it at a temperature of 120° C. to 200° C. to form a silver paste layer on the above-mentioned carbon layer, namely cathode layer 8 composed of a carbon layer and silver paste layer.

Then divide the ends of anode parts 4 linked like a strip, at each tooth of a comb to produce capacitor element 1.

In the first exemplary embodiment, solid electrolyte layer 7 is mainly composed of polypyrrole. Instead, conductive polymer of polythiophene or polyaniline, or manganese oxide substance including manganese dioxide may be used as the principal constituent.

Next, a description is made for the makeup of capacitor unit 10 shown in FIGS. 6 and 7. Capacitor unit 10 is produced in the following way. That is, mount capacitor element 1 on anode frames 11a, 11b and cathode frame 12; laminate five pieces of element 1; couple them together; divide anode frames 11a, 11b and cathode frame 12 off the plate-like base material; and integrate them.

Here, anode frame 11a, 11b and cathode frame 12 are provided continuously at certain intervals integrally with a hoop-shaped base material, by punching and bending a plate-like base material made of copper alloy with a thickness of 0.1 mm. Although five pieces of capacitor elements 1 are laminated in the first exemplary embodiment, any number of pieces more than one may be laminated.

First anode electrodes 13a and second anode electrodes 13b loads multiple capacitor elements 1 laminated, on anode frames 11a and 11b, in such a manner that anode parts 4 project alternately one by one in opposite directions. After laminating, guides 11c at the opposite ends are bent to encompass anode parts 4 as shown in FIG. 4, and then laser-welded at joint 11d to be integrally bonded.

Cathode electrodes 14 are produced in the following way. That is, laminate multiple pieces of capacitor elements 1 through paste of conductive silver adhesive; further place laminated cathode part 5 on bottom 12b of cathode frame 12 through the paste of conductive silver adhesive; and then position and fix capacitor elements 1 by guide 12a of cathode frame 12 at the opposite sides of cathode part 5 to be integrally coupled. Alternatively, cathode layer 8 may be coupled to guide 12a through a conductive silver adhesive.

As shown in FIGS. 1 through 4, and FIG. 21, the direction connecting between first anode terminal 15a and second anode terminal 15b (direction of line X-X in FIG. 2 or 21) is referred to as "lengthwise direction"; and the direction (direction of line Y-Y in FIG. 2 or 21) crossing it, "widthwise direction" hereinafter. First flat parts 17a, 17b are provided at the widthwise ends of first anode terminal 15a and second anode terminal 15b, respectively. Flat parts 17a, 17b are provided at the widthwise ends of first anode terminal 15a and second anode terminal 15b, each forming a step-like stage heading upward from bottom surfaces 16a, 16b.

Place a pair of anode frames 11a, 11b of capacitor unit 10 on first flat parts 17a, 17b, and laser-weld at joint 18. First anode frame 11a and second anode frame 11b are connected to first flat part 17a and first flat part 17b, respectively, with laser welding. Consequently, first and second anode terminals 15a, 15b are connected to anode electrodes 13a, 13b, respectively.

Cathode terminal 19 has second flat part 20 at the widthwise central part of this cathode terminal 19, elevated upward from bottom surface 19c across the lengthwise length. Second flat part 20 is coupled to cathode frame 12.

Place cathode frame 12 of capacitor unit 10 on second flat part 20; and couple bottom 12b of cathode frame 12 to second flat part 20 with a conductive adhesive, to cause cathode terminal 19 to be coupled to cathode electrodes 14.

Cathode terminal 19 has a pair of openings 19b mutually facing lengthwise (direction of line X-X in FIG. 2) sandwiching second flat part 20, and further has a pair of wall surfaces 19a mutually facing widthwise (direction of line Y-Y in FIG. 2) sandwiching second flat part 20. Wall surface 19a is formed across the width of cathode terminal 19.

The end of bottom surface 19c of cathode terminal 19, to be a mounting surface, may be placed as close as possible to adjacent first and second anode terminals 15a, 15b.

Placing first and second anode terminals 15a, 15b closest possible to cathode terminal 19 makes the ESL further smaller.

In first and second anode terminals 15a, 15b and cathode terminal 19, shields 21a, 21b for the anode terminals, and shield 29 for the cathode terminal may be respectively provided at a part where bottom surfaces 16a and 16b come close to bottom surface 19c. Shields 21a, 21b are shaped so as to extend upward from bottom surfaces 16a, 16b respectively toward cathode terminal 19. Meanwhile, shield 29 is shaped so as to extend from the end of bottom surface 19c toward first and second anode terminals 15a, 15b.

This embodiment uses insulating epoxy resin as coating resin 23. Coating resin 23 integrally covers first and second anode terminals 15a, 15b, cathode terminal 19, and capacitor unit 10, with bottom surfaces 16a, 16b to be mounting surfaces for first and second anode terminals 15a, 15b; and bottom surface 19c to be a mounting surface for cathode terminal 19, each exposed.

Coating resin 23 further covers all of first flat parts 17a, 17b, second flat part 20 provided on first and second anode terminals 15a, 15b and cathode terminal 19; shields 21a, 21b, 29; capacitor unit 10, so that they are not exposed out of the coating resin.

The solid electrolytic capacitor according to this embodiment thus has shields 21a, 21b, 29, and covers them with coating resin 23. This makeup reduces deterioration of the ESR characteristic and leakage current characteristic, as a result that oxygen and/or moisture permeating through the interface between coating resin 23, and anode terminals 15a, 15b and cathode terminal 19 reach capacitor element 1.

First and second anode terminals 15a, 15b and cathode terminal 19 thus made are integrally formed by punching plate-like base material made of copper alloy with a thickness of 0.1 mm, and then by bending it. Multiple pieces are provided on a hoop-shaped base material continuously at certain intervals; capacitor unit 10 is loaded on these first and second anode terminals 15a, 15b and cathode terminal 19, and coupled together; they are integrally covered with coating resin 23; and then first and second anode terminals 15a, 15b and cathode terminal 19 are divided off the base material into fragments.

Further, after the above-mentioned dividing, projections 15d may be respectively formed that are ends of these anode terminals bended upward and extending along the side of coating resin 23. Alternatively, after the above-mentioned dividing, projections 19d may be formed that is an end of the cathode terminal bended upward and extending along the side of coating resin 23.

Forming projection 15d or 19d facilitates forming of a solder fillet when the solid electrolytic capacitor is mounted on a printed circuit board.

Concave portions 23a, 23b into which projections 15d, 19d bending upward along the side of coating resin 23 fit may be respectively provided in coating resin 23.

The concave portions prevent projections 15d, 19d from projecting from the surface of coating resin 23, thus facilitating downsizing.

In the solid electrolytic capacitor according to the first exemplary embodiment, anode part 4 of capacitor element 1 is coupled to first and second anode frames 11a, 11b; and coupled to first flat parts 17a, 17b forming a step-like stage on bottom surfaces 16a, 16b at the opposite sides of first and second anode terminals 15a, 15b, through these first and second anode frames 11a, 11b. Further, cathode part 5 of capacitor element 1 is coupled to cathode frame 12, and is coupled together through this cathode frame 12, to second flat part 20 elevated from bottom surface 19c of cathode terminal 19 at the central part. This makeup enables shortening the lead distances from anode part 4 and cathode part 5 of capacitor element 1, to the mounting surfaces for anode terminals 15a, 15b, and cathode terminal 19, respectively. Additionally, the small conducting resistance enables reducing the ESL and ESR.

Capacitor unit 10 has first and second anode electrodes 13a, 13b, mutually facing, and cathode electrodes 14 is arranged between these anode electrodes 13a, 13b. With this makeup, the current path from first anode electrodes 13a of capacitor unit 10 to cathode electrodes 14; and that from second anode electrodes 13b to cathode electrodes 14, move close to each other, and then cross each other on the line connecting anode electrodes 13a and 13b, thus compensating a magnetic field resulting from these current paths to reduce the ESL.

Further, such cathode frame 12 is connected to second flat part 20, and this second flat part 20 is covered with coating resin 23. With this makeup, coating resin 23 entering through opening 19b encompasses wall surface 19a and second flat part 20, thus increasing the bonding strengths between cathode terminal 19 and coating resin 23, and between capacitor unit 10 and second flat part 20.

Meanwhile, increasing the bonding strength between cathode terminal 19 and coating resin 23 reduces possibility of deteriorating the ESR characteristic and leakage current characteristic caused by oxygen and/or moisture permeating through the interface between coating resin 23 and cathode terminal 19 reaching capacitor element 1.

In this embodiment, the description is made for the makeup in which anode body 2 composing capacitor element 1 is made of aluminum foil as an example. However, the present invention is not limited to this makeup, but metal foil or a sintered body of tantalum or niobium, or a combination of these materials may be used.

Second Exemplary Embodiment

Hereinafter, a description is made for another aspect of the present invention using the second exemplary embodiment.

The second exemplary embodiment is an embodiment in which the structures of the capacitor element and capacitor unit are partially different from those in the above-mentioned first exemplary embodiment. The makeup other than these are the same as those in the first exemplary embodiment, and thus the same part is given the same mark to omit its detailed description, and a description is made for different parts using related drawings hereinafter.

Figure 11:
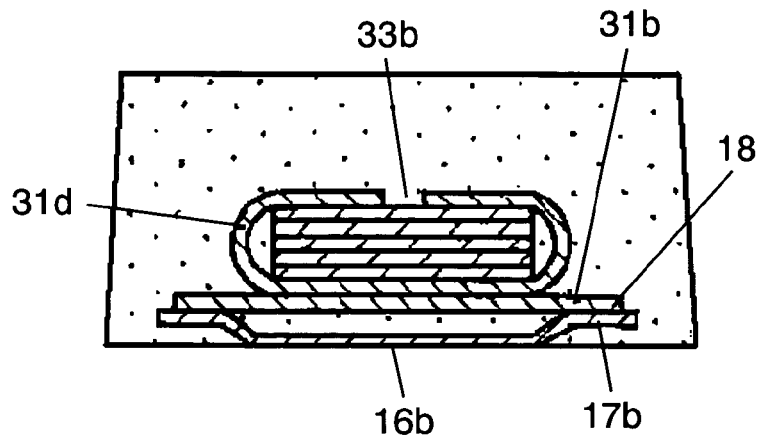
FIG. 11 is a sectional view showing the cross section B-B of FIG. 8.
Figure 12:
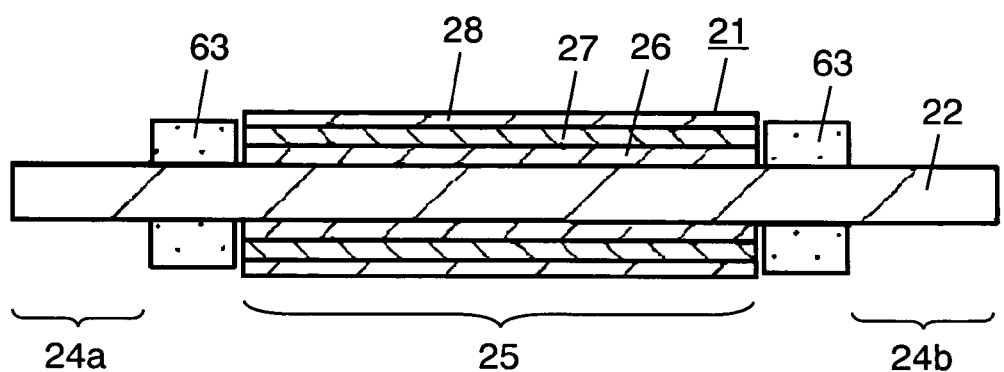
FIG. 12 is a sectional view of a capacitor element according to the second exemplary embodiment of the present invention.
Figure 13:
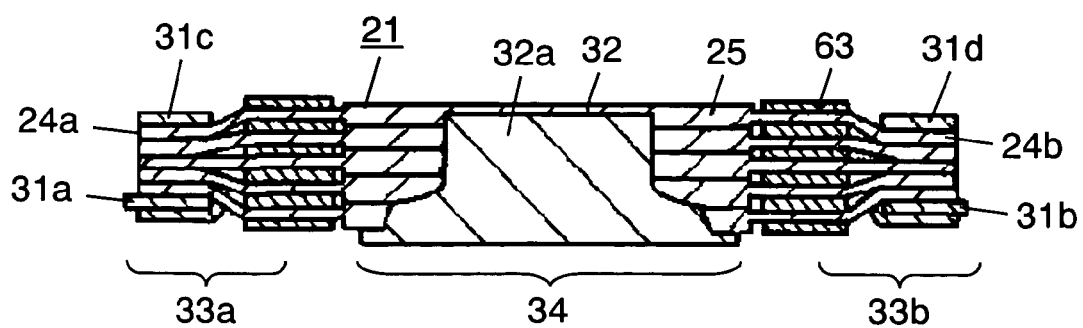
FIG. 13 is a side view of a capacitor unit according to the second exemplary embodiment of the present invention.
Figure 14:
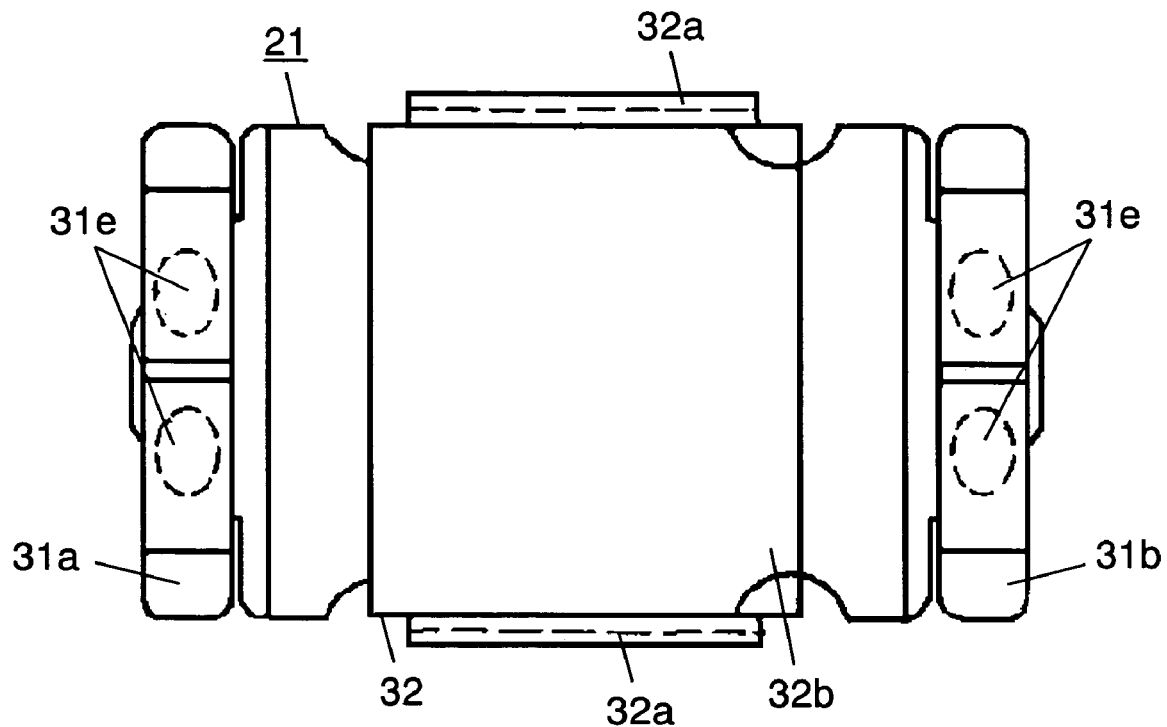
FIG. 14 is a bottom view of the capacitor unit according to the second exemplary embodiment of the present invention.

FIGS. 8 through 11 illustrate the makeup of a solid electrolytic capacitor according to the second exemplary embodiment of the present invention. FIG. 12 is a sectional view illustrating the makeup of a capacitor element used for the solid electrolytic capacitor. FIGS. 13 and 14 are side view and bottom view illustrating the makeup of the capacitor unit, respectively. FIG. 21 is a perspective view of the substantial part illustrating the makeup of an anode terminal and a cathode terminal used for the solid electrolytic capacitor.

As shown in FIG. 12, capacitor element 21 is provided with insulator layer 63 on the surface of flat-shaped anode body 22 made of aluminum foil as a valve metal. Insulator layer 63 is provided between first anode part 24a and cathode part 25, and between second anode part 24b and cathode part 25. That is, first anode part 24a and second anode part 24b are formed at the opposite ends of anode body 22, and cathode part 25 are provided between first anode part 24a and second anode part 24b. Therefore, continuity is made between anode parts 24a and 24b through anode body 22.

Cathode part 25 is made by sequentially laminating dielectric oxide film layer 26, solid electrolyte layer 27 made of conductive polymer, and cathode layer 28 made of a carbon layer and a silver paste layer, on the surface of anode body 22 in the region of cathode part 25.

Next, a description is made for a method of manufacturing capacitor element 21 composed as mentioned above, according to the second exemplary embodiment.

First, electrochemically etch aluminum metal foil with a thickness of 100 μm to roughen the surface.

Next, immerse the roughened aluminum foil in a 3% aqueous ammonium adipate solution, and anodize it at an applied voltage of 12 V at an aqueous solution temperature of 70° C. for 60 minutes. Thus forms an aluminum oxide layer to be a part of dielectric oxide film layer 26.

Next, process the aluminum foil with a part of dielectric oxide film layer 26 formed thereon, into a 6-mm-width strip; form insulator layer 63 with a polyimide adhesive tape along the strip; and then press the strip-shaped aluminum foil to form a ladder-like shape.

This ladder-like shape is a shape in which cross-links and openings are provided alternatively at even intervals in its central part along the lengthwise direction of the strip; and has a joint with its opposite ends linked along the lengthwise direction of the strip.

Capacitor element 21 is formed on the above-mentioned cross-link. That is, cathode part 25 is formed at the central part of the cross-link; and insulator layers 63, and first and second anode parts 24a, 24b are provided at the ends. The ends of first and second anode parts 24a, 24b are respectively formed linking to the linking portion extending from the cross-link.

Next, cover the above-mentioned linking portion, first and second anode parts 24a, 24b, and insulator layer 63, with tape-like resist material; and then anodize anode body 22 including a cross section of the aluminum foil on the above-mentioned ladder-like cross-link. The anodic oxidation forms an aluminum oxide layer, which forms dielectric oxide film layer 26 on the ladder-like cross-link, on the roughened surface and on the cross section surface of the aluminum foil.

Next, a description is made for a method of manufacturing solid electrolyte layer 27.

First, immerse anode body 22 in the region of cathode part 25, in a 30% manganese nitrate aqueous solution; let it dry naturally; and then decompose it by heat at 300° C. for 10 minutes, to form a manganese oxide layer as a conducting layer composing a part of solid electrolyte layer 27.

Next, preliminarily mix 0.5 mol/L of pyrrole monomer and 0.1 mol/L of propyl sodium naphthalenesulfonate. Add water as solvent and propyl phosphoric ester as a pH adjuster to this solution and adjust pH to 2, to produce polymerization solution for forming a solid electrolyte.

Immerse anode body 22 in a region of cathode part 25 with a manganese oxide layer formed, in the polymerization solution for forming a solid electrolyte; approximate an electrode for starting polymerization to the surface of anode body 22, to perform electrolytic oxidation polymerization at a polymerization voltage of 1.5 V. The electrolytic oxidation polymerization produces solid electrolyte layer 27 with conductive polymer layer laminated on the surface of the conducting layer.

Next, a description is made for a method of manufacturing cathode layer 28.

First, remove the above-mentioned resist material with insulator layer 63 being left; apply a colloidal carbon suspension to anode body 22 at the side of cathode part 25;

and then dry the suspension applied on solid electrolyte layer 27, to form the above-mentioned carbon layer.

Next, apply silver paste on anode body 22 at the side of cathode part 25; harden it at a temperature of 120° C. to 200° C. to form a silver paste layer on the above-mentioned carbon layer, to produce cathode layer 28 composed of the carbon layer and silver paste layer.

Further, cut off the ends of first and second anode parts 24a, 24b linked together, to produce capacitor element 21

Capacitor unit 30 shown in FIGS. 13, 14 is produced in the following way. That is, load capacitor element 21 on first and second anode frames 31a, 31b and cathode frame 32; laminate and couple together five pieces of capacitor elements 21; and then divide first and second anode frames 31a, 31b and cathode frame 32, off the above-mentioned plate-like base material, and then integrate.

Here, first and second anode frames 31a, 31b and cathode frame 32 are integrally provided continuously at certain intervals on a hoop-shaped base material, by punching plate-like base material made of copper alloy with a thickness of 0.1 mm, and then bending it. Although five pieces of capacitor elements 21 are laminated in the second exemplary embodiment, any number of pieces may be laminated. Capacitor unit 30 may use only one capacitor element 21, integrated with first and second anode frames 31a, 31b and cathode frame 32, for example.

First anode electrodes 33a and second anode electrodes 33b are first and second anode parts 24a, 24b, of capacitor element 21, respectively placed on first and second anode frames 31a, 31b. As shown in FIG. 11, guides 31c, 31d at the opposite ends are bent, and joint 31e is laser-welded in a state of first and second anode parts 24a, 24b being encompassed. As a result, first anode electrodes 33a and second anode electrodes 33b are integrally coupled together.

Cathode electrodes 34 are produced in the following way. That is, laminate multiple pieces of capacitor elements 21 on cathode frame 32 through paste of conductive silver adhesive; further place cathode part 25 on bottom 32b of cathode frame 32 through paste of conductive silver adhesive; and then position and fix capacitor elements 21 by guide 32a of cathode frame 32 at the opposite sides of cathode part 25, to be integrally coupled. Alternatively, cathode layer 28 may be coupled to guide 32a through conductive silver adhesive.

As shown in FIGS. 8 through 11 for the second exemplary embodiment, capacitor unit 30 is composed of anode terminals 15a, 15b and cathode terminal 19, with the same makeup as in the first exemplary embodiment; coupled to first and second anode frames 31a, 31b and first flat parts 17a, 17b, using the same method; and coupled to cathode frame 32 and second flat part 20.

Expose bottom surfaces 16a, 16b, 19c, to be mounting surfaces for the anode terminal and cathode terminal, from coating resin 23, in the same way as the first exemplary embodiment; and cover integrally with coating resin 23, so that first flat parts 17a, 17b, second flat part 20, shields 21a, 21b, 29, and capacitor unit 30 are not exposed.

Meanwhile, projections 15d, 19d may be formed on first and second anode terminals 15a, 15b and cathode terminal 19, by extending upward each one end of bottom surfaces 16a, 16b, 19c of these anode terminals 15a, 15b and cathode terminal 19, along the side of coating resin 23. Forming projections 15d, 19d facilitates forming of a solder fillet when the solid electrolytic capacitor is mounted on a printed circuit board.

Concave portions 23a, 23b into which projections 15d, 19d bending upward along the side of coating resin 23 fit, may be respectively provided in coating resin 23, which is to facilitate downsizing.

In the solid electrolytic capacitor in the second exemplary embodiment, first and second anode parts 24a, 24b are coupled to first and second anode frames 31a, 31b; and first and second anode frames 31a, 31b are coupled to first flat parts 17a, 17b forming a step-like stage on bottom surfaces 16a, 16b at the opposite sides of first and second anode terminals 15a, 15b. Further, cathode part 25 is coupled to cathode frame 32, and this cathode frame 32 is coupled to second flat part 20 elevated from bottom surface 19c of cathode terminal 19 at the central part. With this makeup, the lead distance can be shortened from first and second anode parts 24a, 24b, or cathode part 25, to the mounting surfaces for anode terminals 15a, 15b, or cathode terminal 19. The small conducting resistance, consequently, enables reducing the ESL and ESR.

The capacitor element has first and second anode parts 24a, 24b arranged at its opposite ends; and cathode part 25 arranged on the surface of anode body 22 conducting between these anode parts. This makeup decreases an apparent current from anode parts 24a, 24b toward the center between these anode parts, thus lowering a magnetic field resulting from these current paths to reduce the ESL.

Further, such cathode frame 32 is connected to second flat part 20, and second flat part 20 is covered with coating resin 23. With this makeup, coating resin 23 entering through opening 19b encompasses wall surface 19a and second flat part 20, thus increasing the bonding strengths between cathode terminal 19 and coating resin 23, and between capacitor unit 30 and second flat part 20.

The exemplary embodiments third through fifth described hereinafter are those with a different structure of the cathode terminal from the first exemplary embodiment. The makeup of the other components is the same as in the first exemplary embodiment, and thus the same mark is given to the same component to omit its description; a description is made only for a different portion using related drawings.

Third Exemplary Embodiment

Figure 15:
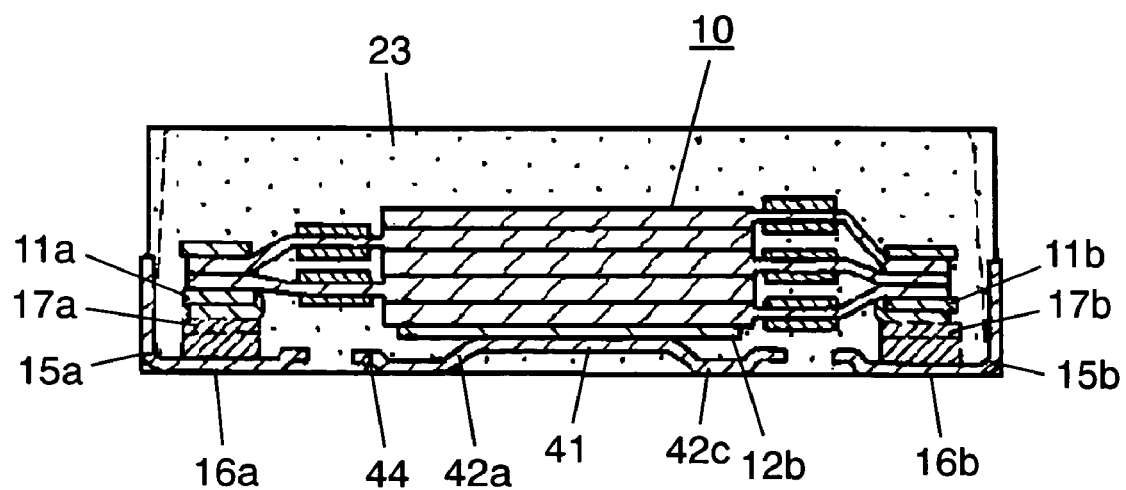
FIG. 15 is a sectional side view illustrating the makeup of a solid electrolytic capacitor according to the third exemplary embodiment of the present invention.
Figure 16:
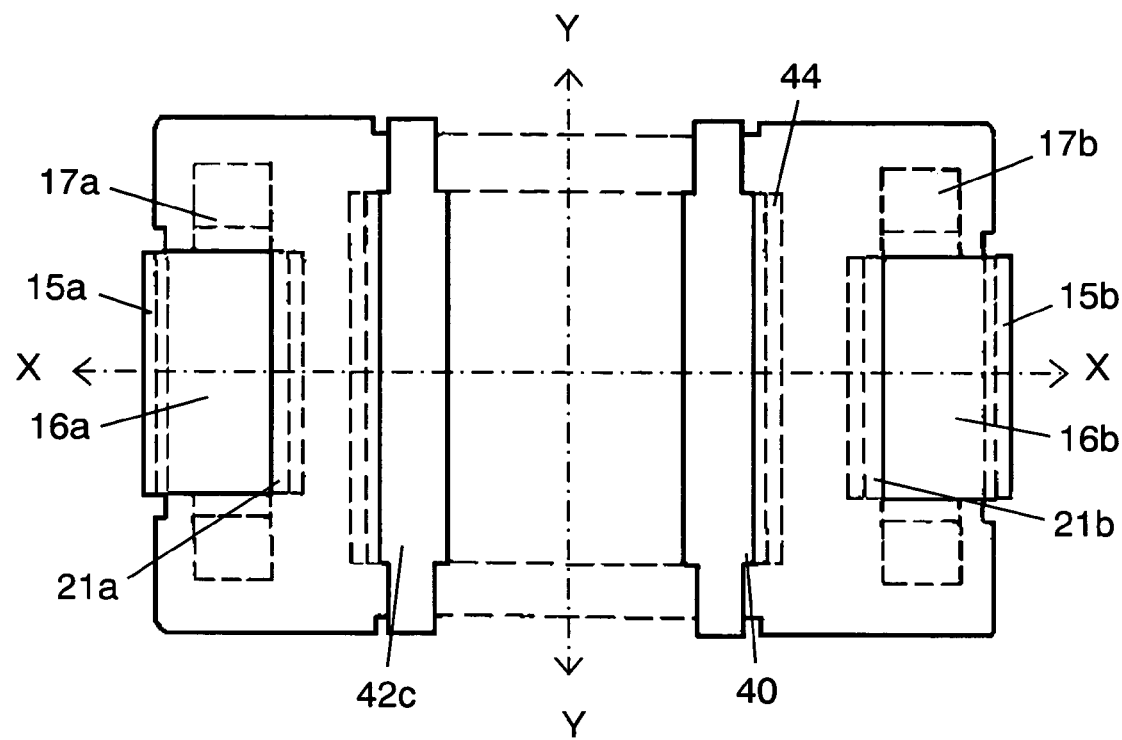
FIG. 16 is a bottom view illustrating the makeup of the solid electrolytic capacitor according to the third exemplary embodiment of the present invention.
Figure 22:
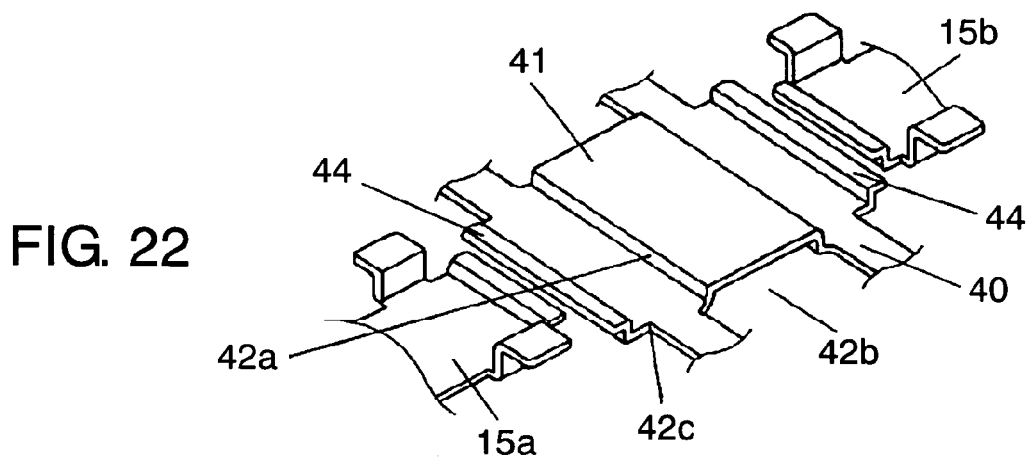
FIG. 22 is a perspective view of the substantial part illustrating the makeup of an anode terminal and a cathode terminal used in the third and sixth exemplary embodiments of the present invention.

FIGS. 15 and 16 illustrate the makeup of a solid electrolytic capacitor according to the third exemplary embodiment of the present invention. FIG. 22 is a perspective view of the substantial part illustrating the makeup of an anode terminal and a cathode terminal used for the solid electrolytic capacitor.

In the third exemplary embodiment, cathode terminal 40 has second flat part 41 that is the entire width of the central part of cathode terminal 40 elevated upward from bottom surface 42c. Second flat part 41 is coupled to bottom 12b of cathode frame 12.

The part elevated toward this second flat part 41 has a pair of wall surfaces 42a facing the entire width of cathode terminal 40, on the direction connecting between first anode terminal 15a and second anode terminal 15b (the direction of line X-X in FIG. 16, referred to as "lengthwise direction" hereinafter). The pair of wall surfaces 42a mutually face and sandwich second flat part 41. Meanwhile, a pair of openings 42b are formed mutually facing and sandwiching second flat part 41 on the direction (the direction of line Y-Y in FIG. 16, referred to as "widthwise direction" hereinafter) crossing the lengthwise direction. The pair of openings 42b mutually face and sandwich second flat part 41.

Second flat part 41 of cathode terminal 40 is coupled to cathode frame 12 of capacitor unit 10 in the first exemplary embodiment, and first flat part 17a, 17b of first and second anode terminals 15a, 15b are coupled to the above-mentioned anode frames 11a, 11b.

The end of bottom surface 42c of this cathode terminal 40 may be placed closest possible to adjacent first and second anode terminals 15a, 15b.

Cathode terminal 40 may be provided with shield 44 extending upward from the end of bottom surface 42c toward first and second anode terminals 15a, 15b, at a part where bottom surface 42c comes close to the bottom surface of first and second anode terminals 15a, 15b.

In the same way as in the first exemplary embodiment, bottom surfaces 16a, 16b, 42c to be mounting surfaces for first and second anode terminals 15a, 15b and cathode terminal 40 are exposed from coating resin 23, and coating resin 23 integrally covers the capacitor so that first and second flat parts 17a, 17b, 41, shield 21a, 21b, 44, and capacitor unit 10 are not exposed.

Fourth Exemplary Embodiment

Figure 17:
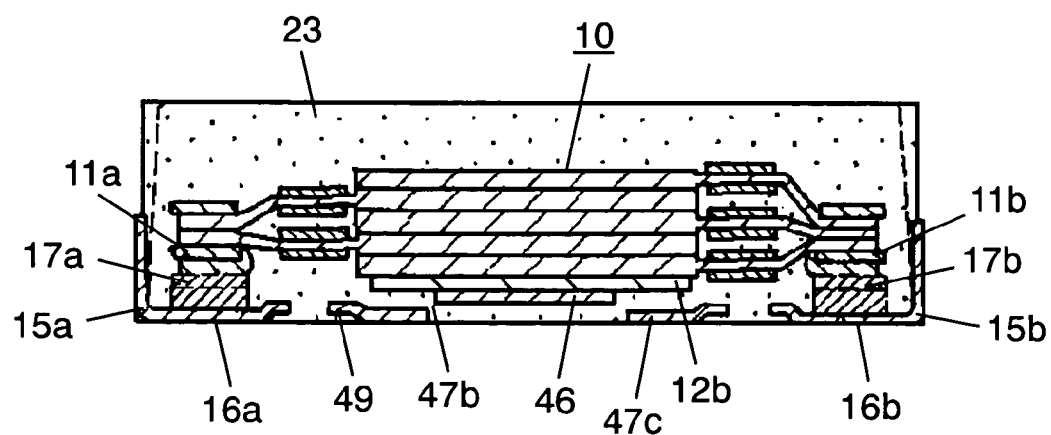
FIG. 17 is a sectional side view illustrating the makeup of a solid electrolytic capacitor according to the fourth exemplary embodiment of the present invention.
Figure 18:
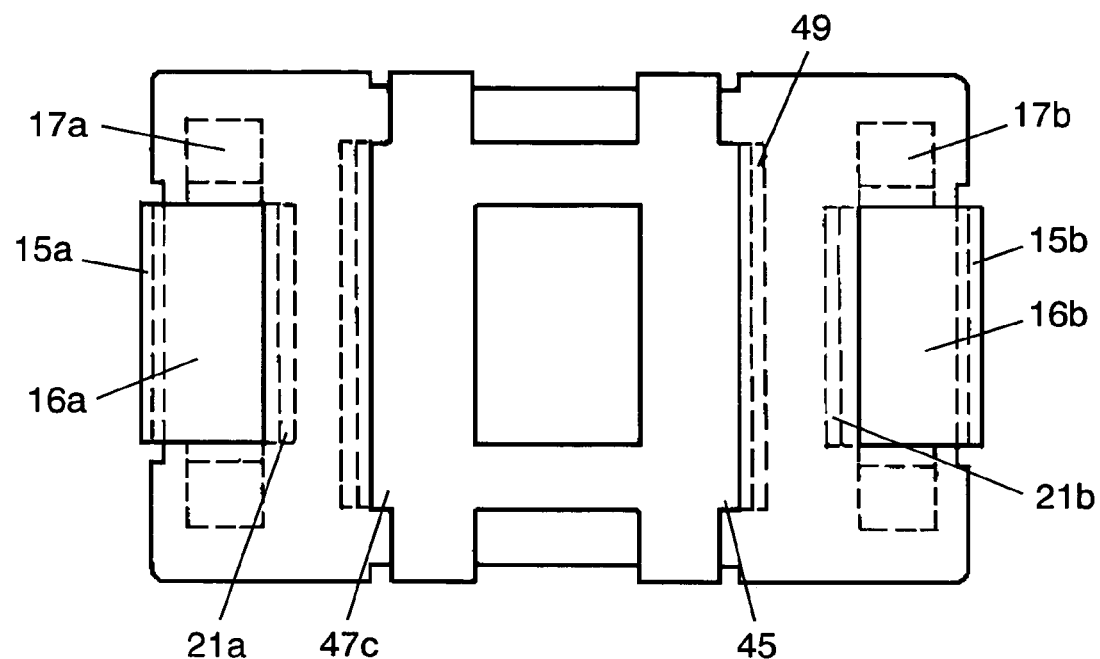
FIG. 18 is a bottom view illustrating the makeup of the solid electrolytic capacitor according to the fourth exemplary embodiment of the present invention.
Figure 23:
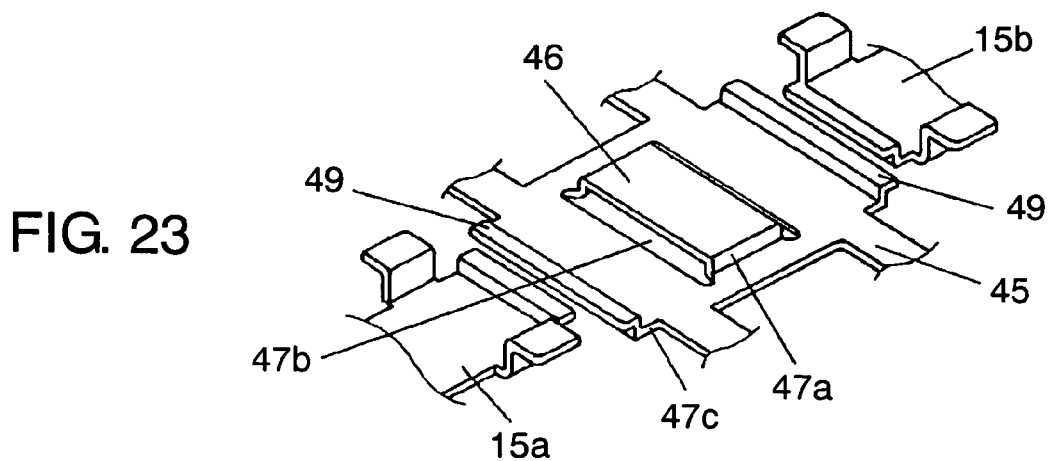
FIG. 23 is a perspective view of the substantial part illustrating the makeup of an anode terminal and a cathode terminal used in the fourth and seventh exemplary embodiments of the present invention.

FIGS. 17 and 18 illustrate the makeup of a solid electrolytic capacitor according to the fourth embodiment of the present invention. FIG. 23 is a perspective view of the substantial part illustrating the makeup of an anode terminal and a cathode terminal used for the solid electrolytic capacitor.

In the fourth exemplary embodiment, cathode terminal 45 has second flat part 46 that is a part of the inside of this cathode terminal 45 elevated upward from bottom surface 47c. Second flat part 46 is coupled to bottom 12b of cathode frame 12.

The part elevated toward second flat part 46 has a pair of openings 47b formed mutually facing and sandwiching second flat part 46, in the lengthwise direction connecting between first anode terminal 15a to second anode terminal 15b. Meanwhile, a pair of wall surfaces 47a are formed mutually facing sandwiching second flat part 46, in the widthwise direction, crossing the lengthwise one. Wall surfaces 47a are formed partially across the width of cathode terminal 45.

Second flat part 46 is coupled to cathode frame 12 of capacitor unit 10 described in the first exemplary embodiment. Meanwhile, first flat part 17a, 17b are coupled to first and second anode frames 11a, 11b.

Here, the end of bottom surface 47c of cathode terminal 45 may be placed closest possible to adjacent first and second anode terminals 15a, 15b.

Cathode terminal 45 may be provided with shield 49 extending upward from the end of bottom surface 47c toward first and second anode terminals 15a, 15b, at a part where bottom surface 47c comes close to the bottom surfaces of first and second anode terminals 15a, 15b.

In the same way as in the first exemplary embodiment, bottom surfaces 16a, 16b, 42c to be mounting surfaces for first and second anode terminals 15a, 15b and cathode terminal 45 are exposed from coating resin 23, and coating resin 23 integrally covers the capacitor so that first and second flat parts 17a, 17b, 41, shield 21a, 21b, 49, and capacitor unit 10 are not exposed.

First and second anode terminals 15a, 15b and cathode terminal 45 thus made are integrally formed by punching a plate-shaped base material made of copper alloy with a thickness of 0.1 mm, and then bending it. Cathode terminal 45 having wall surface 47a and opening 47b with its periphery closed is produced by punch-pressing a part to be opening 47b of a plate-shaped base material and by elevating it.

Fifth Exemplary Embodiment

Figure 19:
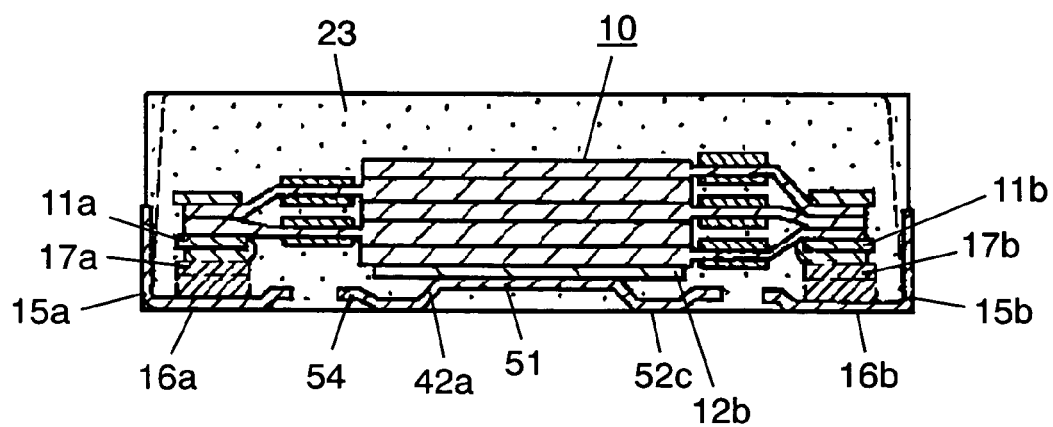
FIG. 19 is a sectional side view illustrating the makeup of a solid electrolytic capacitor according to the fifth exemplary embodiment of the present invention.
Figure 20:
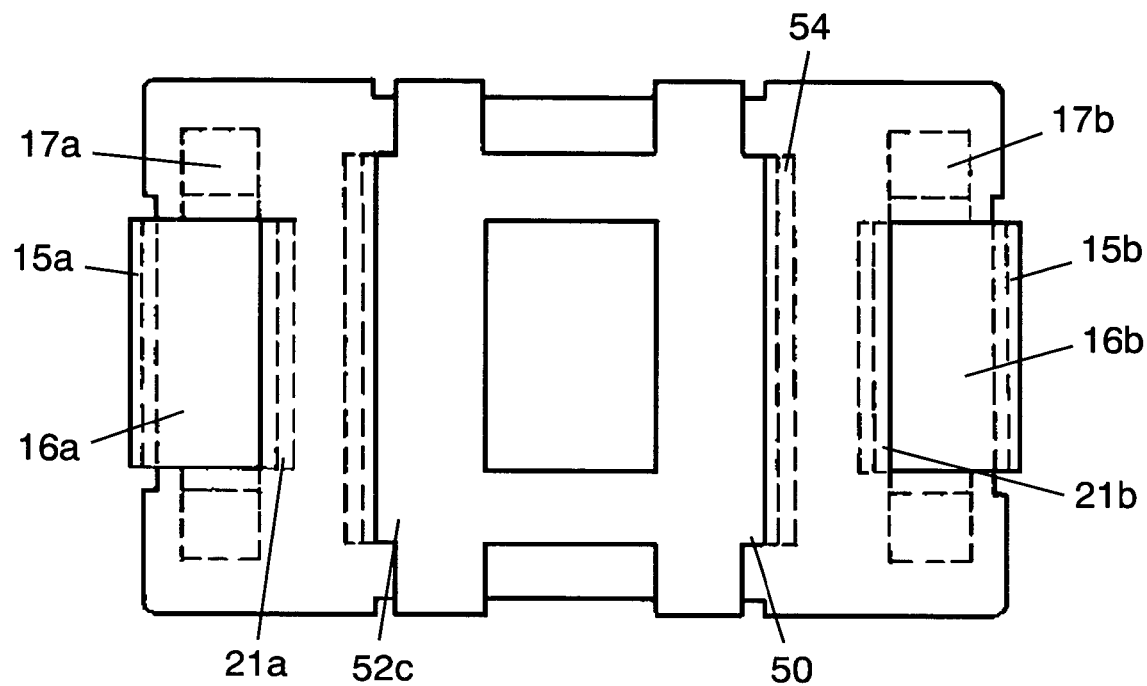
FIG. 20 is a bottom view illustrating the makeup of the solid electrolytic capacitor according to the fifth exemplary embodiment of the present invention.
Figure 24:
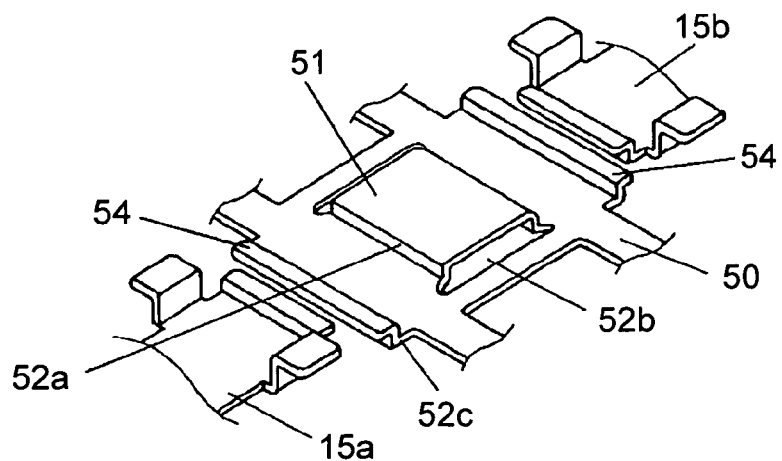
FIG. 24 is a perspective view of the substantial part illustrating the makeup of an anode terminal and a cathode terminal used in the fifth and eighth exemplary embodiments of the present invention.

FIGS. 19 and 20 illustrate the makeup of a solid electrolytic capacitor according to the fifth exemplary embodiment. FIG. 24 is a perspective view of the substantial part illustrating the makeup of an anode terminal and a cathode terminal used for the solid electrolytic capacitor according to the fifth exemplary embodiment of the present invention.

In the fifth exemplary embodiment, cathode terminal 50 has second flat part 51 that is a part of the inside of the central part, elevated upward from bottom surface 52c. Second flat part 51 is coupled to bottom 12b of cathode frame 12.

The part elevated toward second flat part 51 has a pair of wall surfaces 52a formed partially across the width of cathode terminals 50. The pair of wall surfaces 52a face each other and sandwich second flat part 51, and wall surfaces 52a are formed in the lengthwise direction connecting the position of first anode terminal 15a with the position of second anode terminal 15b. Meanwhile, a pair of openings 52b are formed mutually facing and sandwiching second flat part 51, in the widthwise direction, crossing the lengthwise one.

Second flat part 51 is coupled to cathode frame 12 of capacitor unit 10 described in the first exemplary embodiment. First flat part 17a, 17b are coupled to first and second anode frames 11a, 11b.

The end of bottom surface 52c of cathode terminal 50 may be placed closest possible to adjacent first and second anode terminals 15a, 15b.

Cathode terminal 50 may be provided with shield 54 extending upward from the end of bottom surface 52c toward first and second anode terminals 15a, 15b, at a part where bottom surface 52c comes close to the bottom surfaces of first and second anode terminals 15a, 15b.

In the same way as in the first exemplary embodiment, bottom surfaces 16a, 16b, 53 to be mounting surfaces for first and second anode terminals 15a, 15b and cathode terminal 50 are exposed from coating resin 23, and coating resin 23 covers the capacitor so that first and second flat parts 17a, 17b, 51, shield 21a, 21b, 54, and capacitor unit 10 are not exposed.

First and second anode terminals 15a, 15b and cathode terminal 50 thus made are integrally formed by punching a plate-shaped base material made of copper alloy with a thickness of 0.1 mm, and then by bending it. Cathode terminal 50 having wall surface 52a and opening 52b with its periphery closed is produced by punch-pressing a part to be opening 52b of a plate-shaped base material and by elevating it.

Exemplary Embodiments Sixth through Eighth

The exemplary embodiments sixth through eighth have makeup of capacitor unit 30 in the second exemplary embodiment coupled to anode terminals 15a, 15b and cathode terminals 40, 45, 50 in the exemplary embodiments third through fifth. The other components are made in the same way as in the exemplary embodiments third through fifth, to produce a solid electrolytic capacitor.

In other words, first and second anode frames 31a, 31b of capacitor unit 30 are coupled to first flat parts 17a, 17b of first and second anode terminals 15a, 15b; and bottom 32b of cathode frame 32 are coupled to second flat parts 41, 46, 51 in the exemplary embodiments second through fifth.

Ninth Exemplary Embodiment

The ninth exemplary embodiment is provided with a notch in the second flat part of the cathode terminal in the first exemplary embodiment, having the same makeup as the first one for the other components.

Figure 25:
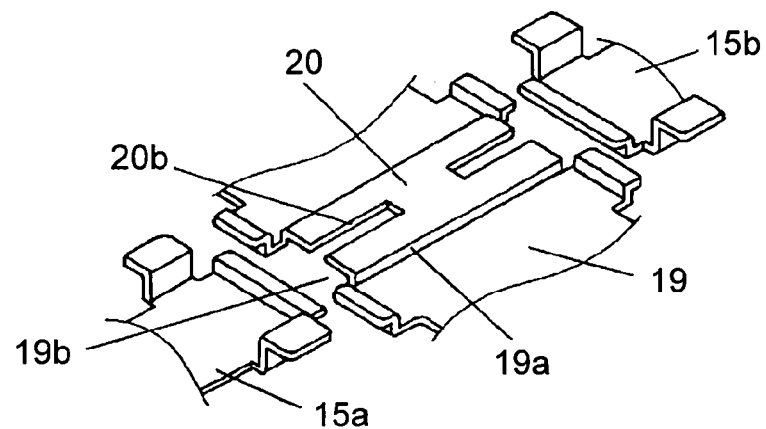
FIG. 25 is a perspective view of the substantial part illustrating the makeup of an anode terminal and a cathode terminal used in the ninth exemplary embodiment of the present invention.
Figure 26:
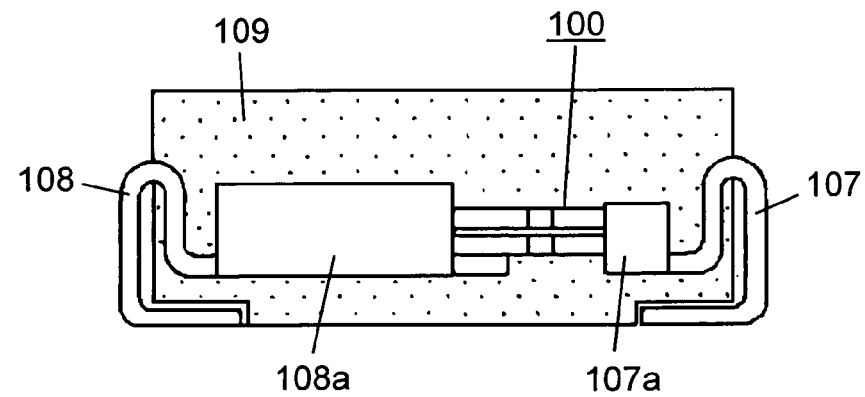
FIG. 26 is a sectional side view illustrating the makeup of a conventional solid electrolytic capacitor.

FIG. 25 is a perspective view of the substantial part illustrating the second flat part of the cathode terminal used for the solid electrolytic capacitor in the ninth exemplary embodiment, with a notch provided therein.

In the ninth exemplary embodiment, cathode terminal 19 has notch 20b formed in second flat part 20, and notch 20b is linked to opening 19b.

Notch 20b could be provided in at least one of openings 19b. Meanwhile, notch 20b may link together openings 19b mutually facing, by providing notch 20b so as to cross second flat part 20.

This makeup allows coating resin 23 to pass through opening 19b, and notch 20b to wrap around. Coating resin 23 that has wrapped around encompasses second flat part 20, thus increasing the bonding strengths between cathode terminal 19 and coating resin 23, and between capacitor unit 10 and second flat part 20.

The second flat part of the cathode terminals in the exemplary embodiments second through eighth may be provided with a notch.

In the solid electrolytic capacitor with the above-mentioned makeup according to the exemplary embodiments third through ninth, the lead distance can be shortened from the anode and cathode parts to the mounting surfaces for the anode and cathode terminals, in the same way as in the first and second exemplary embodiments. The small conducting resistance as a result reduces the ESL and ESR. Coating resin that has wrapped around through the opening encompasses the wall surface and the flat part, thus increasing the bonding strengths between the cathode terminal and the coating resin, and between the capacitor unit and the flat part.

As above-mentioned, in the solid electrolytic capacitor according to the present invention, the anode part of the capacitor element is coupled to the first and second anode frames, and these first and second anode frames are coupled to the first flat part with a step-like stage formed on the bottom surface at the opposite sides of the anode terminal. The cathode part of the capacitor element is coupled to the cathode frame, and this cathode frame is coupled to the second flat part elevated from the bottom surface of the cathode terminal. With this makeup, the lead distances from the anode and cathode parts of the capacitor element to the mounting surfaces for the anode and cathode terminals are shortened respectively to reduce the ESR and ESL.

A capacitor unit is provided that laminates capacitor elements so that anode parts project alternately in reverse directions; anode parts in opposite directions are respectively coupled to the first and second anode frames to be first and second anode electrodes; and meanwhile, the cathode part is coupled to the cathode frames to be cathode electrodes. The current path from the first anode electrodes to the cathode electrodes; and that from the second anode electrodes to the cathode electrodes, move close to each other, and then cross each other on the line connecting the anode electrodes, between adjacent capacitor elements, thus reducing the ESL.

Further, the cathode terminal has a second flat part elevated upward; wall surfaces mutually facing and sandwiching the second flat part; and openings mutually facing and sandwiching the second flat part. The second flat part of the cathode terminal is connected to the cathode frame, and the second flat part is covered with coating resin, allowing the bonding strength between the cathode terminal and cathode frame to be stable.

The solid electrolytic capacitor according to the present invention has excellent ESR and ESL characteristics, and improves the bonding strength between the anode and cathode terminals, and the coating resin. Consequently, the invention offers a particular advantage of being able to stably provide high-performance highly reliable solid electrolytic capacitors, which are useful for capacitors particularly used for around a CPU chip in a personal computer.

It will be obvious to those skilled in the art that various changes may be made in the above-described embodiments of the present invention. However, the scope of the present invention should be determined by the following claims.

What is claimed is:

1. A solid electrolytic capacitor comprising:
   a capacitor element having an anode part and a cathode part;
   a cathode frame coupled to the cathode part;
   a first anode frame and a second anode frame, each coupled to the anode part and provided at opposite sides of the cathode frame;
   a cathode terminal coupled to the cathode frame;
   a first anode terminal coupled to the first anode frame;
   a second anode terminal coupled to the second anode frame; and
   coating resin covering the capacitor element, the coating resin exposing a bottom surface which is used as mounting surfaces for the first and second anode terminals and the cathode terminal;
   wherein the solid electrolytic capacitor has a lengthwise direction connecting between the first anode terminal and the second anode terminal, and a widthwise direction crossing the lengthwise direction;
   wherein the first and second anode terminals have a pair of first flat parts at a given height above a bottom surface of the first and second anode terminals, the first flat parts being located at opposite ends of the widthwise direction;
   wherein the first and second anode frames are respectively coupled to the pair of the first flat parts;
   wherein the cathode terminal is located at a central part of the lengthwise direction, and has a second flat part at a given height above a bottom surface of the cathode terminal;
   wherein the cathode frame is coupled to the second flat part; and
   wherein the first flat part and the second flat part are covered with the coating resin.

2. The solid electrolytic capacitor of claim 1, wherein
   one end of the capacitor element is the anode part and an other end of the capacitor element is the cathode part;
   more than one of the capacitor elements is laminated so that the anode parts project alternately in reverse directions against the cathode part;
   the first anode frame is coupled to one of the anode parts; and
   the second anode frame is coupled to an other of the anode parts.

3. The solid electrolytic capacitor of claim 1, wherein the capacitor element includes:
   a valve metal plate;
   a first anode part and a second anode part provided at opposite ends of the valve metal plate; and
   the cathode part formed on the valve metal plate between the first anode part and the second anode part, and the first anode part and the second anode part are coupled to the first anode frame and the second anode frame, respectively.

4. The solid electrolytic capacitor of claim 1, wherein
at least one of the first and second anode terminals and the cathode terminal has a shield at an end at which a bottom surface of the cathode terminal approximates close to a bottom surface of the anode terminal;
the shield is a part extending upward from the bottom surfaces of the first or second anode terminals or the cathode terminal; and
the shield is covered with the coating resin.

5. The solid electrolytic capacitor of claim 1, wherein
the cathode frame has a pair of openings sandwiching the second flat part in the lengthwise direction; and
the second flat part is provided with a notch linking to the openings.

6. A solid electrolytic capacitor comprising:
a capacitor unit including
a plurality of capacitor elements having an anode part at one end of the capacitor unit and a cathode part at an other end of the capacitor unit, and being laminated so that the anode parts are arranged alternately in reverse directions,
cathode electrodes formed with the cathode part coupled to the cathode frame, and
first anode electrodes and second anode electrodes formed with the anode parts coupled to the anode frame;
a cathode terminal coupled to the cathode electrodes through the cathode frame;
a first anode terminal and a second anode terminal respectively coupled to the first anode electrodes and the second anode electrodes through the anode frame; and
coating resin covering the capacitor elements, the coating resin exposing a bottom surface which is used as mounting surfaces for the first and second anode terminals and the cathode terminal;
wherein the first and second anode terminals have a flat part formed as a step-like stage extending upward from the bottom surfaces of the first and second anode terminals at opposite ends of a direction crossing a direction connecting between the first and second anode terminals;
wherein the flat part of the anode terminal is coupled to the anode frame;
wherein the cathode terminal has a flat part in a center of the cathode terminal, wherein the flat part of the cathode terminal is formed by being elevated upward from a bottom surface of the cathode terminal;
wherein the flat part of the cathode terminal is coupled to the cathode frame;
wherein a pair of wall surfaces mutually face, and a pair of openings mutually face, sandwiching the flat part of the cathode terminal; and
wherein the flat part of the anode terminal and the flat part of the cathode terminal are covered with the coating resin.

7. A solid electrolytic capacitor comprising:
a capacitor unit including
a capacitor element having a cathode part in a center of an anode body, and first and second anode parts at opposite ends of the capacitor sandwiching the cathode part,
cathode electrodes formed with the cathode parts coupled to the cathode frame, and
first and second anode electrodes formed with the first and second anode parts coupled to the anode frame;
a cathode terminal coupled to the cathode electrodes through the cathode frame;
a first anode terminal and a second anode terminal respectively coupled to the first anode electrodes and the second anode electrodes through the anode frame; and
coating resin covering the capacitor element, the coating resin exposing a bottom surface which is used as mounting surfaces for the first and second anode terminals and the cathode terminal;
wherein the first and second anode terminals have a flat part formed as a step-like stage extending upward from bottom surfaces of the first and second anode terminals at opposite ends of a direction crossing a direction connecting between the first and second anode terminals;
wherein the flat part of the anode terminal is coupled to the anode frame;
wherein the cathode terminal has a flat part formed in a center of the cathode terminal, wherein the flat part of the cathode terminal is formed by being elevated upward from the bottom surface of the cathode terminal;
wherein the flat part of the cathode terminal is coupled to the cathode frame;
wherein a pair of wall surfaces mutually face, and a pair of openings mutually face, sandwiching the flat part; and
wherein the flat part of the anode terminal and the flat part of the cathode terminal are covered with the coating resin.

* * * * *